(12) United States Patent
Heise

(10) Patent No.: US 7,182,126 B2
(45) Date of Patent: Feb. 27, 2007

(54) FLUID HEATER

(76) Inventor: Lorne Heise, R.R. #2, Minden, Ontario K0M 2K0 (CA)

( * ) Notice: Subject to any disclaimer, the term of this patent is extended or adjusted under 35 U.S.C. 154(b) by 6 days.

(21) Appl. No.: 10/954,265

(22) Filed: Oct. 1, 2004

(65) Prior Publication Data

US 2005/0092471 A1 May 5, 2005

Related U.S. Application Data

(60) Provisional application No. 60/507,127, filed on Oct. 1, 2003.

(51) Int. Cl.
*F28F 1/10* (2006.01)
(52) U.S. Cl. ................................ 165/142; 165/172
(58) Field of Classification Search ................ 165/142, 165/155, 172
See application file for complete search history.

(56) References Cited

U.S. PATENT DOCUMENTS

| | | | | |
|---|---|---|---|---|
| 165,550 A | * | 7/1875 | Dietz | 138/32 |
| 1,607,152 A | * | 11/1926 | Eggleston | 165/142 |
| 2,778,609 A | * | 1/1957 | Peeps | 165/164 |
| 2,785,542 A | * | 3/1957 | Thomas | 62/511 |
| 3,151,633 A | * | 10/1964 | Shuman | 138/177 |
| 3,315,703 A | * | 4/1967 | Matthews | 138/111 |
| 4,194,536 A | * | 3/1980 | Stine et al. | 138/149 |
| 4,279,270 A | * | 7/1981 | Francis, Jr. | 137/340 |
| 4,284,352 A | * | 8/1981 | Carson et al. | 356/134 |
| 4,421,136 A | * | 12/1983 | Aubert | 137/340 |
| 4,628,989 A | * | 12/1986 | Parker et al. | 165/46 |
| 5,363,907 A | * | 11/1994 | Dunning et al. | 165/46 |
| 6,158,231 A | * | 12/2000 | Singer | 62/201 |
| 6,742,576 B2 | * | 6/2004 | Bergevin | 165/133 |
| 6,926,077 B2 | * | 8/2005 | Kuga et al. | 165/170 |
| 2002/0134448 A1 | * | 9/2002 | Goodman | 138/104 |

FOREIGN PATENT DOCUMENTS

CA 2019590 C 12/1994

* cited by examiner

*Primary Examiner*—Teresa J. Walberg
(74) *Attorney, Agent, or Firm*—Blake, Cassels & Graydon LLP; John R. S. Orange

(57) ABSTRACT

A heat distribution apparatus comprising a fluid conduit having a peripheral wall defining a flow passage and a pair of fluid capillaries extending along the wall and secured thereto. The capillaries being connected to one another in series to provide a fluid flow path along one of the capillaries and a return path along another of said capillaries to convey heat exchange fluid to transfer heat between the flow passage and the heat exchange fluid.

6 Claims, 3 Drawing Sheets

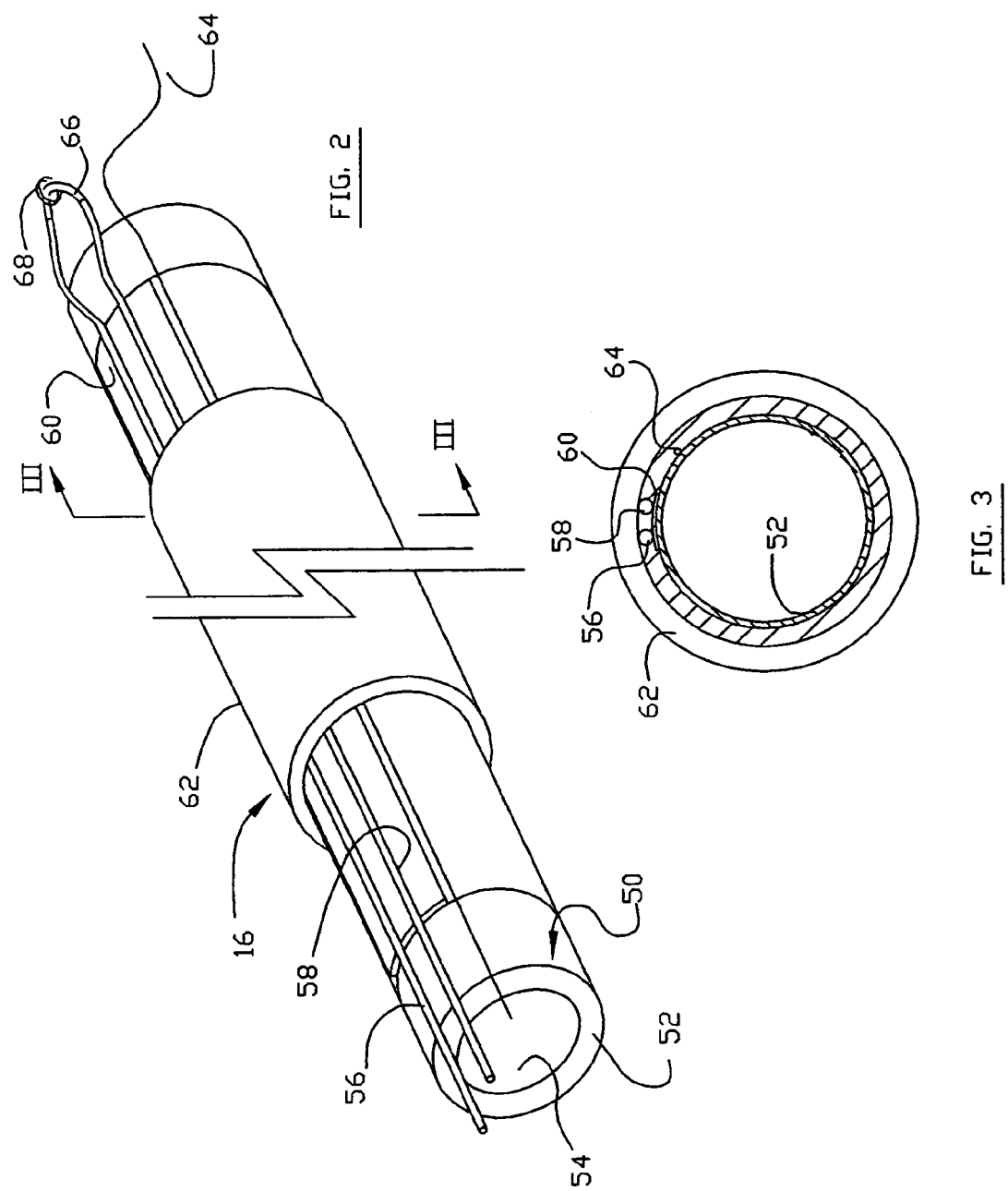

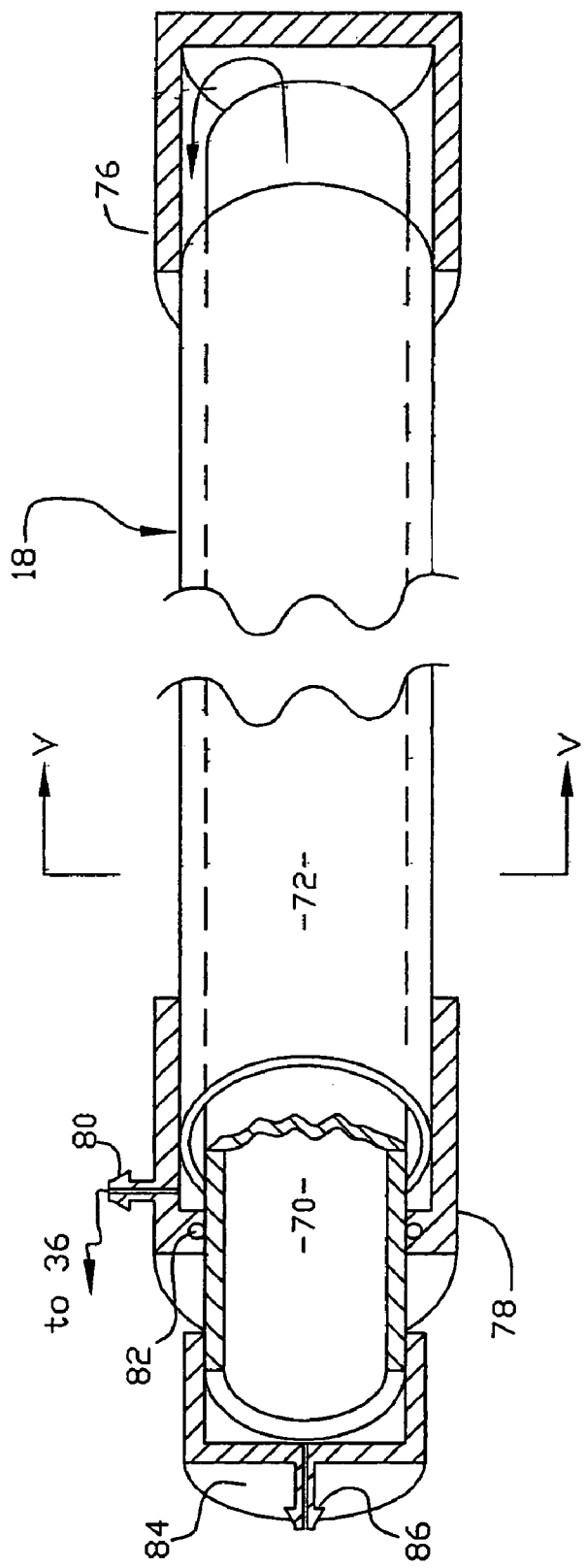

FLUID HEATER

This application claims priority from U.S. Patent Application No. 60/507,127 filed on Oct. 1, 2003.

FIELD OF THE INVENTION

The present invention relates to methods and apparatus for distributing heat to or removing heat from remote locations.

DESCRIPTION OF THE PRIOR ART

It is often necessary to distribute heat to or remove heat from remote locations to inhibit freezing at that location. For example, in a fluid conveying system such as a water supply system, there is a danger during cold weather that fluid in the conduit will freeze. There are many proposals to supply heat to such a conduit such as by wrapping an electric heating cable about the conduit but these have tended to be used in locations close to. an electrical power source. Moreover, such installations tend to be used intermittently due to their relative inefficiency and power consumption.

An alternate form of heating apparatus is shown in Canadian Patent 2019590 in which a self-regulating heating cable is inserted within a fluid conduit. With this arrangement it is possible to insulate the conduit to conserve energy and to regulate the power consumption due to the self-regulating nature of the cable. This arrangement has found wide-spread use, particularly in domestic water supplies in remote areas. The heating effect obtained from this installation is however limited to the available length of the heating cable which becomes a limiting factor in some installations. Moreover, the electrical system is prohibited in some environments such as sewers or drains that may contain methane because of the possibility of ignition of sewer gas. There is also a reticence to use electric heating cables in some environments where the cable may be exposed, such as roof and gutter de-icing, where damaged cables may come in contact with water and can result in fire when breakdown occurs. Proper electrical installation ensures the safe operation of such devices but nevertheless there is always a risk of improper installation.

It will also be appreciated that such cables cannot function to extract heat from the fluid.

It is therefore an object to the present invention to provide a method and apparatus for providing heat to remote locations in which the above disadvantages are obviated or mitigated.

SUMMARY OF THE INVENTION

According to one aspect of the present invention there is provided a fluid conduit having a peripheral wall to define a flow passage and a pair of fluid capillaries extending along the wall. The capillaries are connected in series and secured to the wall. Fluid may then flow along one of the capillaries in one-axial direction and be returned through the other capillary in the opposite direction. The capillaries are connected to a source of heat exchange fluid and thereby transfer heat through the wall of the conduit between the heat exchange fluid and fluid within the conduit.

In an alternative embodiment, the capillaries may be contained within the peripheral wall defining the conduit. In both embodiments an external jacket may be applied to provide insulation to the conduit.

In an alternative aspect of the invention there is provided a heating apparatus comprising a pair of concentric conduits and an end-cap at one end of said conduits to direct fluid flowing in one of the conduits to the other. At the opposite end, the conduits are connectable to a source of heat exchange fluid.

In a further aspect, the present invention provides a heat distribution system having a source of heat exchange fluid, a manifold having a fluid supply and a fluid return, a pump to circulate fluid between the supply and return through the heat exchange fluid source and a conduit connected to each of the supplies and returns with said conduits being connected in series. The conduits transfer heat along their path.

BRIEF DESCRIPTION OF THE DRAWINGS

These and other features of the preferred embodiments of the invention will become more apparent in the following detailed description in which reference is made to the appended drawings wherein:

FIG. 2 is a perspective view of a heat distribution apparatus used in the system of FIG. 1.

FIG. 3 is a view on the line III of FIG. 2.

FIG. 4 is a view partly in section of an alternative embodiment of heating apparatus used in the system of FIG. 1.

FIG. 5 is a view on the line V—V of FIG. 4.

DESCRIPTION OF THE PREFERRED EMBODIMENTS

Figure 1:
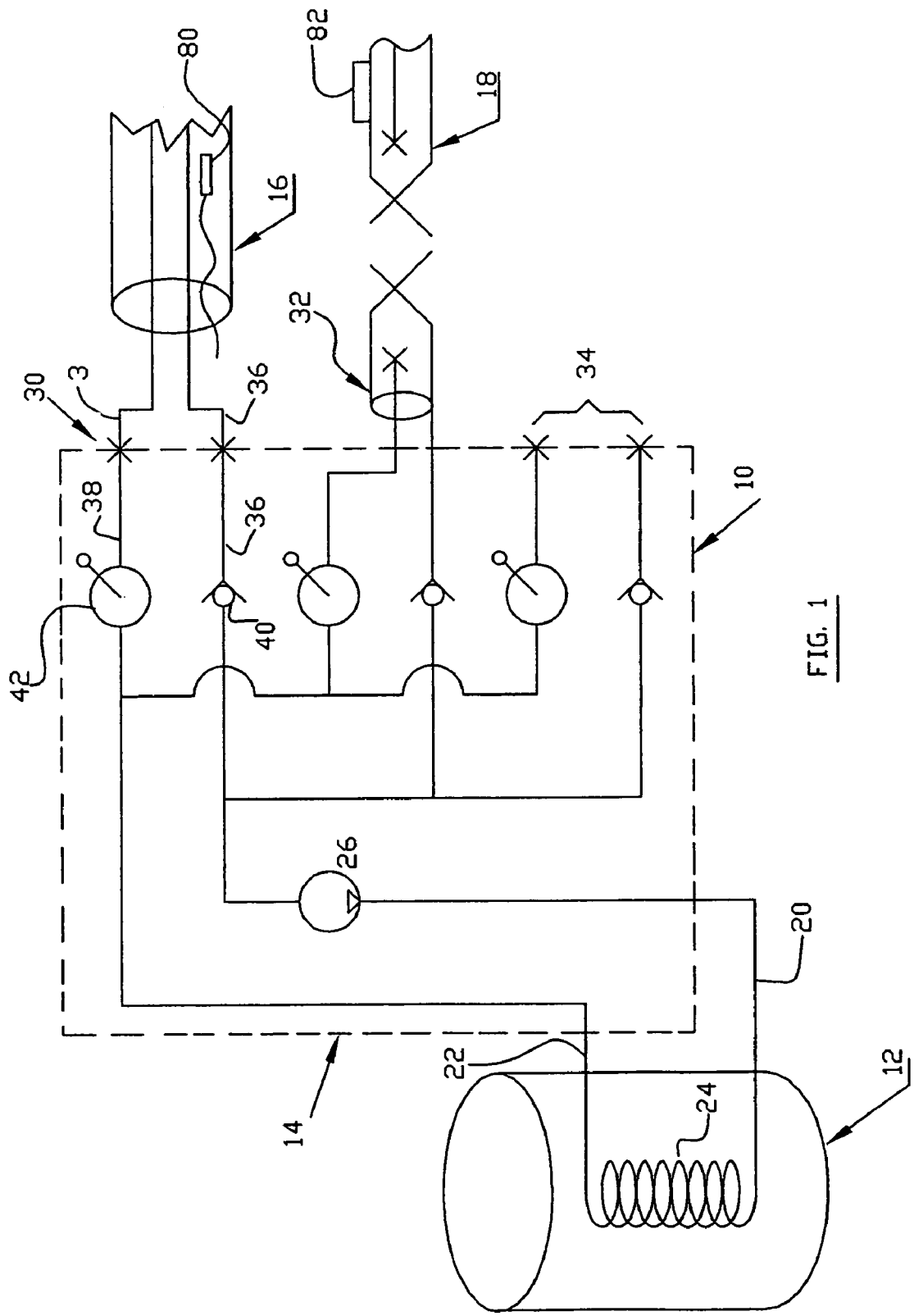
FIG. 1 is a schematic representation of a heat distribution system.
Figure 1:
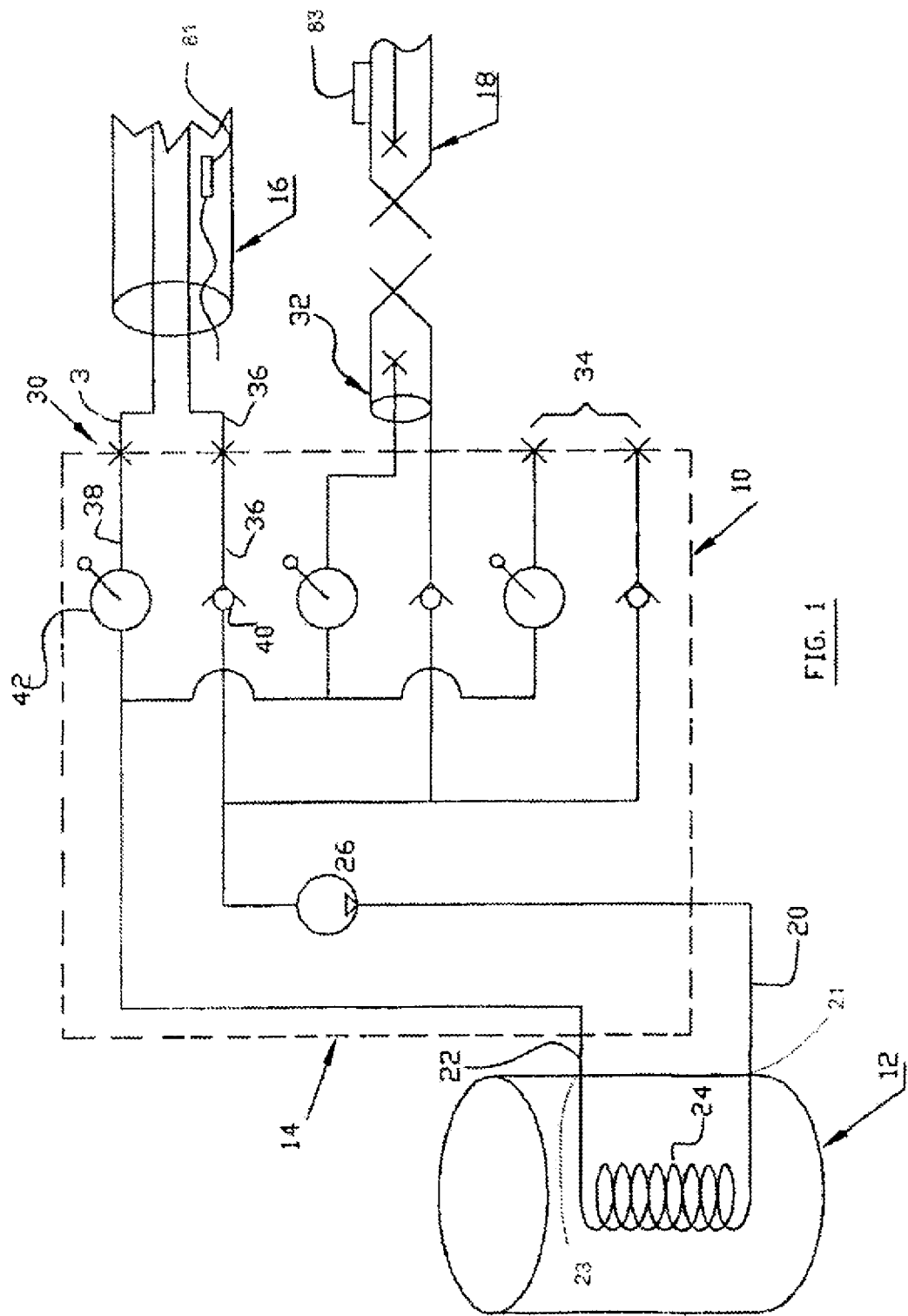
Figure 1:
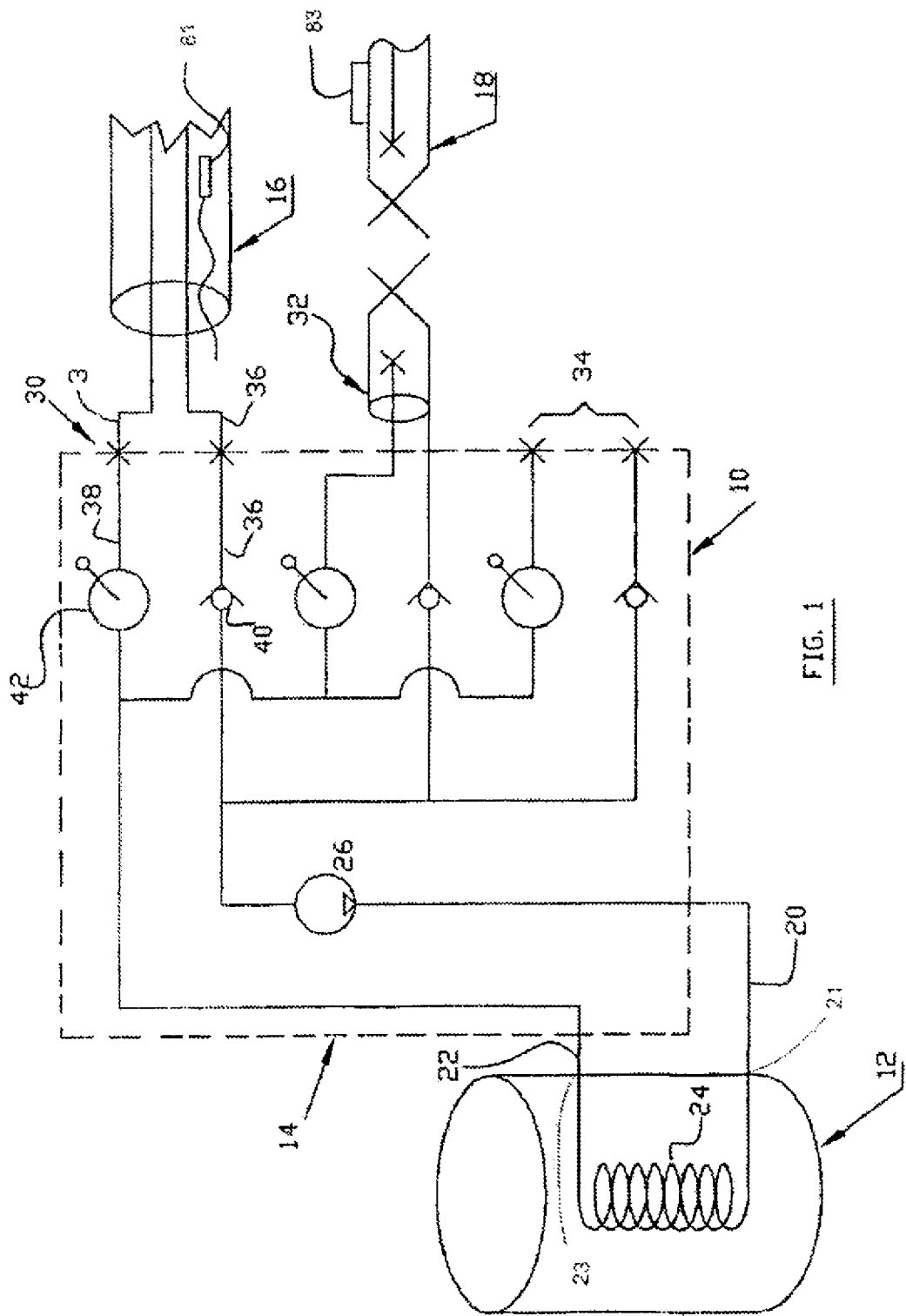

Referring therefore to FIG. 1, a heat distribution system 10 includes a fluid heater 12, a central manifold 14 and a pair of heat distribution apparatus 16, 18 connected at respective locations to the manifold 14. It will be appreciated that a cooling effect can be obtained using a fluid cooler rather than a heater but for ease of description reference will be made to the apparatus functioning as a heater.

The fluid heater 12 is connected to the manifold 14 through a supply line 20 and a return line 22. The lines 20, 22 are connected through an inlet 21 and outlet 23 to a coil 24 within the heater 12. A heating source, such as a gas or electric heater, is supplied to the coil 24 so that fluid within the coil 24 is heated as it passes through the coil between the inlet 21 and outlet 23. Fluid is circulated through the coil 24 by a pump 26 located within the manifold 24 and connected to the supply line 20. The lines 20, 22 are connected to each of a series of outlets 30, 32, 34 provided on the manifold 14. Each of the outlets 30, 32, 34 has a pair of pipes 36, 38, one of which is connected to the supply line 20 and the other of which is connected to the return line 22. The pipe 36 is connected to the supply line 20 through a check valve 40 and the return line 22 is connected to the pipe 38 through a selector valve 42. The valve 42 may be moved between an open and closed position to permit fluid to flow from the pump 26 through the coil 24 to be discharged in the supply conduit 22 and to the outlet 30. The manifold therefore permits selective distribution of fluid to one or more of the outlets 30, 32, 34.

The heat distribution apparatus 16 is connected to the outlet 30 and is shown in greater detail in FIG. 2. The apparatus 16 includes a conduit 50 having a peripheral wall 52 defining an interior channel 54 through which a fluid to be heated, for example water, flows. A pair of capillary tubes 56, 58 are located on the exterior of the peripheral wall 52 and extend axially parallel to the axis of the conduit 50. A metallic tape 60 is interposed between the capillary tubes and the wall 52 and an outer sleeve 62 is located over the conduit 50. The sleeve 62 is preferably made from heat shrinkable plastics material and retains the capillary tubes 56, 58 in location. A tracer wire 64 extends parallel to the capillary tubes 56, 58 to assist in locating the apparatus 16 at a later date if it is buried or hidden.

At one end of the conduit 52, the capillary tubes 56, 58 are interconnected by a connector 66. The connector 66 is a press fit on the exterior of the capillary tubes 56, 58 and may be secured by a suitable cement. The connector 66 also includes a wire loop 68 that may be used to indicate the end of the capillaries during a subsequent inspection.

The opposite end of the capillaries 56, 58 are split from the conduit 52 and connected at the port 30 to the lines 36, 38 respectively. A continuous loop is therefore provided from the pump 26 through the heater 12 and the capillaries 56, 58 for fluid that is heated within the coil 24. The conduit 52 is used to convey fluid, such as a water supply line and the heat supplied from fluid flowing through the capillaries 56, 58 flows through the wall 52 to maintain the fluid above the freezing point or other predetermined temperature. The supply of heat may be regulated by varying the temperature of the fluid or by varying the flow rate through modulation of the pump 26.

An alternative heat distribution apparatus 18 is shown in greater detail in FIGS. 4 and 5 and is intended for the direct application of heat to remote areas such as an eavestrough or roof or to be located internally within a fluid conduit, such as a water pipeline sewer. The heat distribution apparatus 18 includes a pair of concentric ducts 70, 72 defined by annular walls 71,73 respectively with an end-cap 76 bridging the termination of the ducts 70, 72. At the opposite end, an end-cap 78 provides a spigot 80 for connection to the line 36. The conduit 70 extends through the end-cap 78 where it is sealed by an o-ring 82 and terminates in an end-cap 84 with a connecting spigot 86 for connection to the line 38.

Again, therefore, the heated fluid is discharged through the spigot 86 into the duct 70 and is re-directed by end-cap 76 into the exterior duct 72. Heat is transferred across the wall of the duct 72 to provide distributed heating to the surrounding environment.

Each of the heat distribution apparatus 16, 18 has one or more temperature sensors 80, 82, along the axis to sense either the temperature of fluid in conduit 52 or the ambient temperature. The sensor 80, 82 control the valves 42 to direct fluid to the outlet at which heat is required.

The heating apparatus 16 may be co-extruded as a unitary moulding and sized to meet the requirements of the fluid within the conduit 52. The heating apparatus 18 is likewise sized to provide a flexible pliant heater that may be entrained along the edge of a roof or within an eavestrough.

Typically the fluid conduit is a extruded polyethylene pipe or similar extrudeable material. A cross linked polyethylene pipe, such as that known by the trade name PEX or KITEC is suitable. For a conduit of nominal 50 mm diameter the capillary tubes 56, 58 have a diameter of 5 mm to 10 mm for the apparatus 18, the ducts 70, 72 have a diameter of 12 mm to 16 mm, although it will be appreciated that other dimensions may be used to suit different applications.

In the embodiment of FIGS. 2 and 3, the number of capillary tubes 56, 58 may be increased to 4, 6, or more if required to meet the heating needs for particular environments. The pair of capillary tubes 56,58 may then be connected in parallel and supplied through a common manifold or may be controlled independently so that the heating effect can be regulated according to the ambient temperature. Thus, as the temperature drops below a given level, an additional pair of capillaries are connected to the heat source and additional heat supplied to the conduit by multiple flow paths.

It will also be appreciated that the capillaries may be wound about the exterior of the conduit in a spiral pattern if so desired to distribute the heating effect uniformly over the wall 52 of the conduit.

The capillaries may be co-extruded with the conduit 50 and may be secured with adhesive if preferred.

Although the invention has been described with reference to certain specific embodiments, various modifications thereof will be apparent to those skilled in the art without departing from the spirit and scope of the invention as outlined in the claims appended hereto.

The embodiments of the invention in which an exclusive property or privilege is claimed are defined as follows:

1. A heat distribution apparatus comprising:
   a fluid conduit having a radially inner peripheral wall defining a flow passage and a pair of fluid capillaries extending along said radially inner wall and secured thereto, said capillaries being connected to one another in series to provide a fluid flow path along one of said capillaries and a return path along another of said capillaries to convey heat exchange fluid to transfer heat between said flow passage and said heat exchange fluid, a heat-distributing layer interposed between said capillaries and said radially inner peripheral wall and extending circumferentially beyond said capillaries, a tracer wire extending along said radially inner wall and a radially outer wall to retain said capillaries and said wire in engagement with said peripheral wall.

2. A heat distribution apparatus according to claim 1 wherein said radially outer wall and said radially inner peripheral wall are co-extruded so as to be integrally formed.

3. A heat distribution apparatus according to claim 1 wherein said heat distributing layer is a metal foil.

4. A heat distribution apparatus according to claim 1 wherein said radially outer wall is a sleeve.

5. A heat distribution apparatus according to claim 4 wherein said sleeve is formed from a heat shrinkable plastic material.

6. A heat distribution apparatus according to claim 1 wherein an insulating jacket encompasses said radially outer wall and said capillaries.

* * * * *

UNITED STATES PATENT AND TRADEMARK OFFICE
CERTIFICATE OF CORRECTION

PATENT NO.        : 7,182,126 B2                                        Page 1 of 1
APPLICATION NO.   : 10/954265
DATED             : February 27, 2007
INVENTOR(S)       : Lorne R. Heise It is certified that error appears in the above-identified patent and that said Letters Patent is hereby corrected as shown below:

In the Drawings:
Sheet 1, Figure 1, insert reference numerals --21-- and --23--.
Sheet 1, Figure 1, delete reference numeral "80" and insert reference numeral --81--.
Sheet 1, Figure 1, delete reference numeral "82" and insert reference numeral --83--.

Column 3, line 45, delete "80, 82" and insert --81, 83--.
Column 3, line 47, delete "80, 82" and insert --81, 83--.

Signed and Sealed this

Twenty-fourth Day of March, 2009

JOHN DOLL
*Acting Director of the United States Patent and Trademark Office*

UNITED STATES PATENT AND TRADEMARK OFFICE
CERTIFICATE OF CORRECTION

PATENT NO. : 7,182,126 B2
APPLICATION NO. : 10/954265
DATED : February 27, 2007
INVENTOR(S) : Lorne R. Heise It is certified that error appears in the above-identified patent and that said Letters Patent is hereby corrected as shown below:

In the Drawings:
    Sheet 1, Figure 1, insert reference numerals --21-- and --23--.
    Sheet 1, Figure 1, delete reference numeral "80" and insert reference numeral --81--.
    Sheet 1, Figure 1, delete reference numeral "82" and insert reference numeral --83--.

Column 3, line 45, delete "80, 82" and insert --81, 83--.
    Column 3, line 47, delete "80, 82" and insert --81, 83--.

This certificate supersedes the Certificate of Correction issued March 24, 2009.

Signed and Sealed this

Fourteenth Day of April, 2009

JOHN DOLL
*Acting Director of the United States Patent and Trademark Office*